(12) United States Patent
Anderson (10) Patent No.: US 10,429,803 B2
(45) Date of Patent: Oct. 1, 2019

(54) MULTIFACTOR INTELLIGENT AGENT CONTROL

(71) Applicant: Intel Corporation, Santa Clara, CA (US)

(72) Inventor: Glen J. Anderson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 790 days.

(21) Appl. No.: 14/494,246

(22) Filed: Sep. 23, 2014

(65) Prior Publication Data

US 2016/0086095 A1    Mar. 24, 2016

(51) Int. Cl.
*G05B 15/02* (2006.01)
*G06F 3/0487* (2013.01)
(Continued)

(52) U.S. Cl.
CPC ............. *G05B 15/02* (2013.01); *G06F 1/169* (2013.01); *G06F 3/0487* (2013.01); *G06F 3/04847* (2013.01)

(58) Field of Classification Search
CPC ................................ G05B 15/02; G06F 1/169
See application file for complete search history.

(56) References Cited

U.S. PATENT DOCUMENTS

| 8,775,332 B1 | 7/2014 | Morris et al. |
| 2007/0094195 A1 | 4/2007 | Wang |

(Continued)

FOREIGN PATENT DOCUMENTS

| CN | 106605239 A | 4/2017 |
| JP | 06012401 A | 1/1994 |

(Continued)

OTHER PUBLICATIONS

Hong, Jongyi, et al. "Context-aware system for proactive personalized service based on context history." Expert Systems with Applications 36.4 (2009): 7448-7457.*

(Continued)

*Primary Examiner* — Scott A. Waldron
*Assistant Examiner* — Kevin W Figueroa
(74) *Attorney, Agent, or Firm* — Schwegman Lundberg & Woessner, P.A.

(57) ABSTRACT

System and techniques for multifactor intelligent agent control are described herein. A history of intelligent agent activity may be received. The history may include a record of intelligent agent activities and corresponding factors used as intelligent agent input to generate the activities. Detail-level-feedback input from a user may also be received. The detail-level-feedback input is the result of a user manipulating a detail-level-feedback user interface that is generic to any factor. An entry-time corresponding to the user manipulation of the detail-level-feedback user interface may be recorded. A set of factors may be identified from the corresponding factors based on a combination of the history of intelligent agent activity and the entry-time. The intelligent agent may be modified by changing an internally represented influence of members of the set of factors on the intelligent agent. The internally represented influence may be changed in accordance with the detail-level-feedback input.

24 Claims, 7 Drawing Sheets

(51) Int. Cl.
*G06F 1/16* (2006.01)
*G06F 3/0484* (2013.01)

(56) References Cited

U.S. PATENT DOCUMENTS

| | | | |
|---|---|---|---|
| 2008/0235162 | A1 | 9/2008 | Spring |
| 2009/0112608 | A1* | 4/2009 | Abu-Hakima ........ G06F 9/4868 705/345 |
| 2012/0150642 | A1 | 6/2012 | Kandanala et al. |
| 2013/0006904 | A1 | 1/2013 | Horvitz et al. |
| 2013/0254139 | A1* | 9/2013 | Lei ....................... G06N 99/005 706/11 |
| 2013/0290339 | A1* | 10/2013 | LuVogt ............. G06F 17/30867 707/740 |
| 2014/0052681 | A1* | 2/2014 | Nitz ........................ H04L 51/02 706/46 |

FOREIGN PATENT DOCUMENTS

| | | |
|---|---|---|
| JP | 2003285285 A | 10/2003 |
| JP | 2005085274 A | 3/2005 |
| JP | 2007000938 A | 1/2007 |
| JP | 2009508394 A | 2/2009 |
| JP | 2014164754 A | 9/2014 |
| WO | WO-2004068456 A2 | 8/2004 |
| WO | WO-2016048691 A1 | 3/2016 |

OTHER PUBLICATIONS

"International Application Serial No. PCT/US2015/049749, International Search Report dated Jan. 4, 2016", 3 pgs.
"International Application Serial No. PCT/US2015/049749, Written Opinion dated Jan. 4, 2016", 5 pgs.
"European Application Serial No. 15844443.0, Extended European Search Report dated Apr. 16, 2018", 9 pgs.
"A Notification Timing Learning Method from User's Response History", The 19th Annual Conference of the Japanese Society for Artificial intelligence, (2005), 1-2.
"Chinese Application Serial No. 201580043702.0, Office Action dated Aug. 21, 2018", w/ Concise Statement of Relevance , 9 pgs.
"Japanese Application Serial No. 2017-515972, Notification of Reasons for Rejection dated Jun. 12, 2018", w/ English Translation, 12 pgs.
"Chinese Application Serial No. 201580043702.0, Resposne Filed Jan. 3, 2019 to Office Action dated Aug. 21, 2018", w/English Claims, 14 pgs.
"European Application Serial No. 15844443.0, Response filed Nov. 19, 2018 to Extended European Search Report dated Apr. 16, 2018", 14 pgs.
"Japanese Application Serial No. 2017-515972, Examiners Decision of Final Refusal dated Oct. 9, 2018", W/English Translation, 4 pgs.
"Japanese Application Serial No. 2017-515972, Response filed Sep. 11, 2018 to Notification of Reasons for Rejection dated Jun. 12, 2018", w/ English claims, 12 pgs.

* cited by examiner

| RECENT AGENT ACTIVITY | CONTEXTUAL DETERMINATION/ STATUS | USER INPUT | ADJUSTMENTS TO THRESHOLDS |
|---|---|---|---|
| HIGH LEVEL OF FACE DETECTION IN LAST THIRTY SECONDS | LOCATION- DOWNTOWN; SOCIAL- GROUP; ACTIVITY- CONVERSING | THREE LEVELS LESS | FACE RECOGNITION DOWN-ADJUST; LOCATION SERVICES AT HIGH; SECURITY ALERTS AT LOW |
| NO RECOMMENDATIONS IN THE LAST ONE MINUTE | LOCATION- DOWNTOWN; SOCIAL- ALONE; ACTIVITY- WALKING | TWO LEVELS MORE | SECURITY ALERTS UP- ADJUST; FACE RECOGNITION AT MEDIUM; LOCATION SERVICES AT HIGH |

MULTIFACTOR INTELLIGENT AGENT CONTROL

TECHNICAL FIELD

Embodiments described herein generally relate to artificial intelligence and more specifically to multifactor intelligent agent control.

BACKGROUND

Artificial intelligence is a field concerned with developing artificial systems to perform cognitive tasks that have traditionally required a living actor, such as a person. Of the variety of aspects of the artificial intelligence field, intelligent agents are systems that perceive the environment in some way and take actions based on that perception. Interaction with intelligent agents may occur via the environment (e.g., providing environmental data upon which the intelligent act may act) or via direct manipulation of the intelligent agent decision making process (e.g., adjusting weights of a neural network without providing input to input neurons). A multi-factor intelligent agent includes a plurality of discrete contextual categories (e.g., factors) upon which the multi-factor intelligent agent may act.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Intelligent agents may operate as assistants to people. For example, an intelligent agent may monitor the physical and logical (e.g., messages, social media statuses, etc.) environment of a user and provide exactly the level of assistance needed to the user when that assistance is needed. Often, however, users will want some control over the "intensity" of intelligent agent involvement under different circumstances. This control may be desired over agents that work across multiple factors (e.g., fitness, safety, social interaction, etc.). For example, the user may prioritize a particular time and place for contemplative meditation and desire to restrict commercial alerts (e.g., advertisements) during that time and at that place. The user could be provided an interface to adjust the commercial alert factor with the specified time and place in order to produce fewer alerts. Factors are data sets that are used by an intelligent agent to render decisions, such as alerts, manipulating a device, etc. Factors may be processed data from one or more sensors. For example, a face recognition factor may use data from a camera sensor and a recognition database to produce output such as providing the identity of a person. As the number of factors handled by the agent grows, however, so too does the complexity of such a control mechanism.

An alternative solution to the multi-factor agent control problem is to provide a single user interface to obtain detail-level-feedback from the user and apply this feedback with factors based on the time the feedback was received and the time the factors were used by the intelligent agent. Detail-level-feedback is feedback from the user on the level of detail (e.g., frequency, amount, type, etc.) the user desires from the intelligent agent generally. For a simple example, assume that of three factors, only one or two were used to provide a set of alerts. The user may provide detail-level-feedback, similar to a volume control, indicating to "turn up" the alerts contemporaneous to actuation of the control. The intelligent agent may identify the one or two factors by the chronological proximity of the factor use and the detail-level-feedback input in time and increase the likelihood (e.g., by adjusting a weight) that these two factors will generate alerts. In an example, other contextual data may be integrated into the likelihood adjustment, such as time, place, occasion (e.g., holiday, wedding, birthday, etc.), company (e.g., friends, family, business colleagues, fellow students, strangers, etc.). In this manner, the user is given control over the multi-factor intelligent agent without having to engage in cumbersome configuration of each factor of the agent. For example, if intelligent agent activity results in a large number of people's names being displayed, turning down the control may result in a reduction in the number of facial recognition factor outputs that result in a display. If the reduction is, for example, a reduction in sampling frequency, the camera providing the data for the facial recognition factor may be shut down to conserver power.

Figure 1:
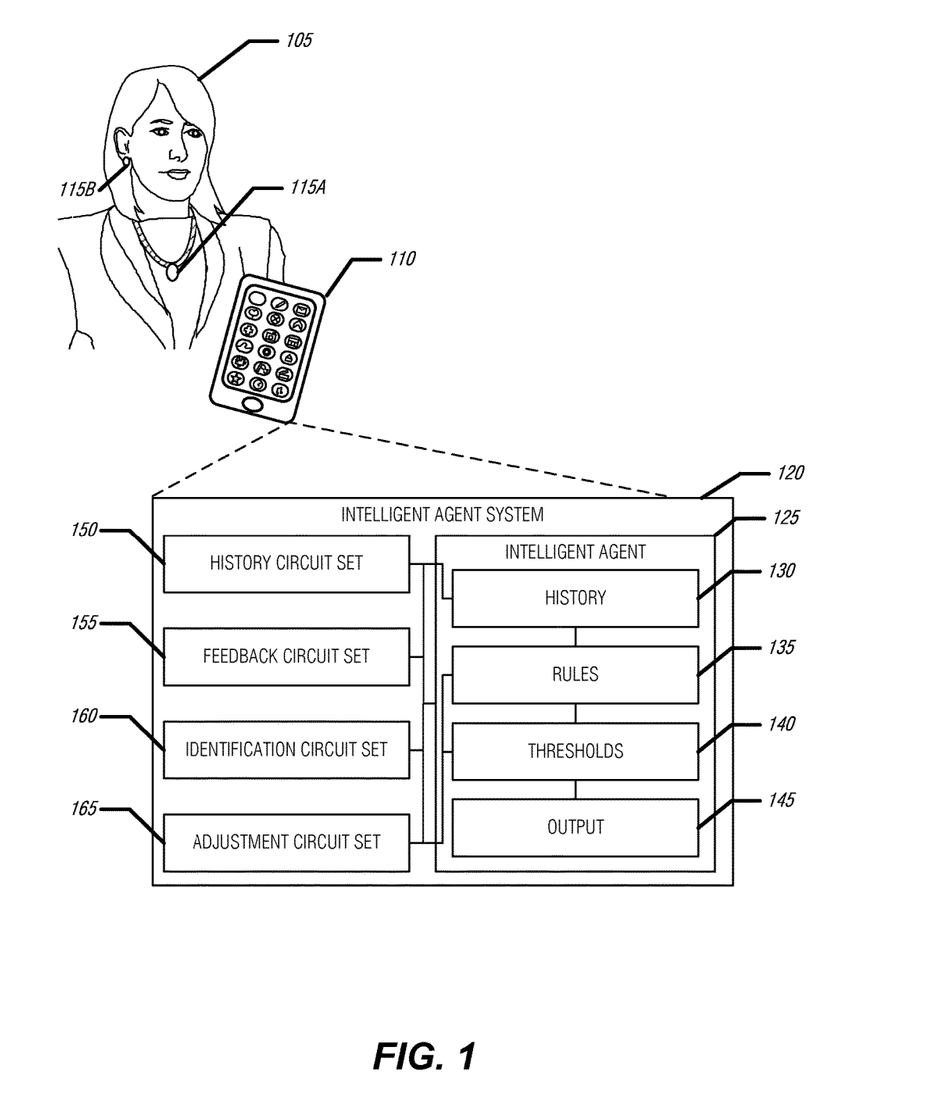
FIG. 1 is a block diagram of an example of an environment including a system for multi-factor intelligent agent control, according to an embodiment.

FIG. 1 is a block diagram of an example of an environment 100 including an intelligent agent system 120 for multi-factor intelligent agent control. The environment 100 may include a device 110 to host the intelligent agent system 120, and one or more wearable sensors 115. The intelligent agent system 120 may include an intelligent agent 125, a history circuit set (CS) 150, a feedback CS 155, an identification CS 160, and an adjustment CS 165. The intelligent agent 125 may have a variety of components including history 130, rules 135, thresholds 140, and output 145.

The intelligent agent 125 uses a combination of the history 130, rules 135, and thresholds 140 to produce information for the user 105 via the output. Typically, the history 130 may include records of data from a variety of sensors (e.g., sensors 115A and 115B). This data may include environmental data (e.g., temperature, barometric pressure, light level, noise level, time, date, recognized devices within a distance of the user 105, etc.), social data (e.g., messaging, proximity to other people as measured by facial recognition or device recognition and affinity to others, calendar events, etc.) among others. The rules 135 may provide an integration of the variety of factors to support conclusions by the intelligent agent 125. For example, a rule may specify that the proximity of friends on the calendar date of the user's birthday results in a determination that the user 105 is at their birthday party. The rules 135 may integrate with, or be subject to, the thresholds 140. For example, the thresholds 140 may include factor specific thresholds such that a measurement below the threshold for the factor is treated as no measurement at all. In an example, the threshold may apply to the rule determination as a whole. For example, the user 105 may "mute" determinations that the user 105 is at a party. This mute action may be accomplished by raising a threshold for the corresponding rules to a value that is not achievable by the rule. The output 145 provides the mechanism by which a decision that satisfies the rules 135 and thresholds 140 results in a notification to the user 105. Example notifications may be visual (e.g., a light), audible (e.g., a beep or buzzer), haptic (e.g., vibrating), or a combination of these.

The history CS 150 may obtain a portion of the history pertaining to activity by the intelligent agent 125. This portion of the history may be contained in the history 130 of the intelligent agent 125 or stored elsewhere (e.g., in a cloud mirror of the history 130 or an audit log, etc.). In an example, the history 130 includes a data structure for each event. In an example, the event record may include a weighted collection of factors that participated in the culmination of a respective event. In an example, the event is an alert. In an example, the events include a decision not to issue an alert. For example, when a metric to issue an alert (e.g., a threshold) is not met, the event is logged and an indication that the threshold was not met is included in the event record. In an example, the event record may include timing information corresponding to the event. In an example, The timing information may include the date or time when the event occurred. In an example, the timing information may include times or dates of: when the sensor data underlying a factor was captured, when the factor was determined, or the longevity of the factor data (e.g., a proximity alert may be short lived while a holiday last for a day).

The feedback CS 155 may obtain detail-level-feedback input from the user 105. The detail-level-feedback input is the result of the user 105 manipulating a detail-level-feedback user interface that is generic to any factor (i.e., not specific to any factor) used as input to the intelligent agent 125 in generating an intelligent agent activity in the history of intelligent agent activity. That is, the detail-level-feedback user interface does not include identified controls for individual factors, nor are the controls reassigned to factors prior to use by the user 105, but rather the user interface is a general input of the desired level of detail (e.g., how many alerts) by the user. The detail-level-feedback input includes a direction. In an example, the detail-level-feedback input may also include a degree in the direction. In an example, the direction may be one of more than two possible directions. For example, the direction may include up, greater, down, less, neutral, etc. In an example, the possible directions are limited to two (e.g., greater and less). In an example, the direction and degree may be combined as a set of discrete choices. For example, a single button of the detail-level-feedback user interface may be actuated to cycle through the discrete choices such that, for example, pushing the button: one time corresponds to "greater +1"; two times to "greater +2"; three times to "less +2"; and four times to "less +1" or the like.

In an example, the detail-level-feedback user interface is on a device 110 used by a user 105. In an example, the detail-level-feedback user interface includes a moving actuator on the device 110. Example moving actuators may include buttons, dials, rocker bars, or other physically manipulated features of the device 110, including moving the device itself (e.g., tilting, shaking, etc.). In an example, the moving actuator is a volume control of the device 110. The use of the volume control already present on a device allows for the re-tasking of hardware existing on the device 110 while maintaining a similar use pattern for the user 105. Thus, "turn up" detail-level-feedback input is entered in the same way the user 105 would "turn up the volume" for music.

The identification CS 160 may identify a set of factors based on the combination of the portion of the history of intelligent agent activity and a time in which the detail-level-feedback input was obtained. In an example, the set of factors include a value obtained from a sensor 115. Example sensors may include time, temperature, geographical locator, biometric, etc. In an example, the sensor 115 is relevant to the user 105 based on a physical distance between the sensor 115 and the user 105. In an example, the relevance is additionally based on the type of sensor. For example, a heart-rate monitor embedded in a necklace 115A is relevant to the user 105 by virtue of the user 105 wearing the sensor 115A. If the sensor 115A were left on the nightstand, for example, it would not be relevant. Conversely, a news monitoring sensor is relevant as long as it may monitor the news without regard to its location.

In an example, the set of factors may be identified in response to determining that the set of factors were inputs to the intelligent agent 125 for activity in the history 130 within a predetermined time period of the detail-level-feedback input. Thus, chronological proximity to the receipt of the detail-level-feedback is used to identify the set of factors. In an example, the predetermined time period may be different between at least two of the input factors. That is, multiple time periods may be applied in identifying the set of input factors. In an example, the predetermined time period is specific to the type of factor. Thus, a factor of one type (e.g., location) may have a more immediate relevance and garner a shorter time period that a second factor type (e.g., a holiday, or other calendar level factor), which may garner a longer time period.

The adjustment CS 165 may modify an influence of members of the set of factors on future intelligent agent activity in accordance with the detail-level-feedback. In an example, influence of the members of the set of factors may be modified by adjusting a weight of the members in accordance with the detail-level-feedback input. For example, if the detail-level-feedback corresponds to greater detail, the weight of the members may be increased. In an example, a first weight of a first member may be adjusted differently than a second weight of a second member of the set of factors. For example, the first weight may be increased more than the second weight. This may be done to, for example, support a factor paid for by a third party over an unsupported factor. In an example, where the detail-level-feedback has a direction (e.g., up, down, left, right, etc.), the first weight may be adjusted in the direction and the second weight is not adjusted in that direction. For example, the first weight may be adjusted up while the second weight is not, although the second weight may be adjusted in another direction. In an example, where the detail-level feedback has only two possible directions (e.g., up and down), the first weight may be in the first direction (e.g., the one indicated by the detail-level-feedback, and the second weight is in the second direction. Such an arrangement allows for the reduction in factors that where not represented during the receipt of the detail-level-feedback.

In an example, instead or in addition to a weight being applied to a factor, the factor's influence may be adjusted by adjusting an event (e.g., alert) threshold of an intelligent agent activity in which the members of the set of factors are components. For example, the threshold may be raised in response to a detail-level-feedback input indicating a negative response by the user 105. In this way, a combinatorial approach may be implemented as opposed to the more factor specific approach described above. Thus, a factor's participation in an alert that garnered the negative detail-level-feedback input will not result in a second alert to which that factor participates. In an example, the event is identified instead of an individual factor, the event being recorded in the history 130. In this example, the event serves as a proxy for identifying the underlying factors.

In an example, the event threshold is a zonal filter, such as a high-pass filter, a low-pass filter, or a pass-band filter. In the examples of the high-pass or low-pass filters, the adjustment to the threshold raises or lowers the cut-off point for the filter. In the example of a pass-band filter, the envelope (e.g., range) of the pass-band filter (e.g., the lower bound and the upper bound) may be adjusted in response to the detail-level-feedback input in a particular direction. For example, the distance between the two bounds of the envelope may be maintained while the center of the envelope may be adjusted up or down. In an example, the envelope itself may be widened or shortened without moving the center of the envelope.

Figure 2:
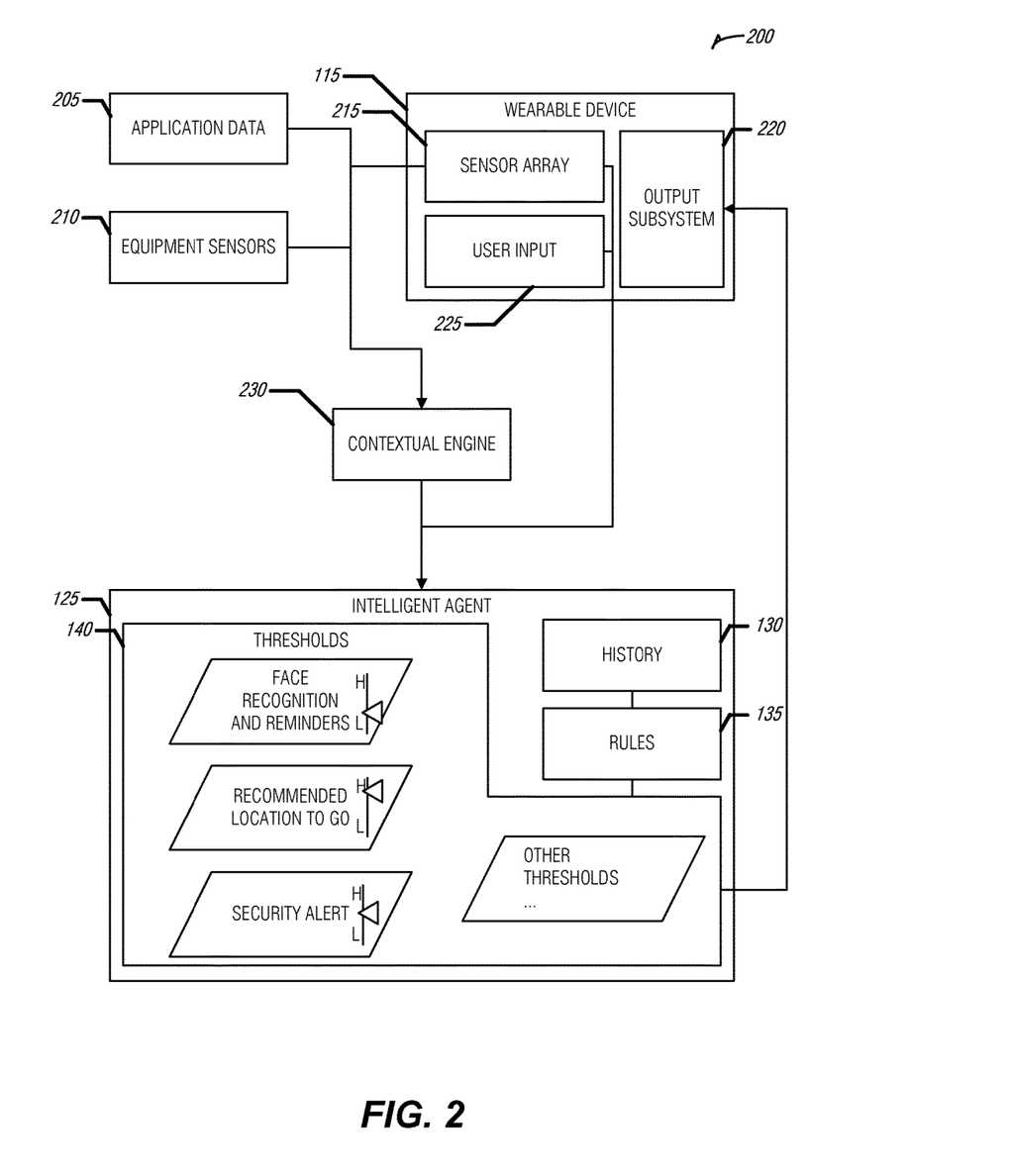
FIG. 2 illustrates a block diagram of an example of a system for multi-factor intelligent agent control, according to an embodiment.

FIG. 2 illustrates a block diagram of an example of a system 200 for multi-factor intelligent agent control. The system 200 is an alternative of the system 100 described above, but many features may function in a similar manner. The system 200 may include application data 205 (e.g., calendar, messaging, task list, etc.) and equipment sensors 210 (e.g., time, temperature, proximity, etc.) that provide factor data. The system 200 may include a wearable device 115, such as a watch, earing, necklace, etc. The wearable device 115 may include a sensor array 215 (e.g., for sensors that are personal to the user 105 when the wearable device 115 is worn), user input CS 225, and an output subsystem 220. The user input CS 225 supports the detail-level-feedback user interface and the output subsystem 220 provides notification mechanisms to the user 105.

Data from the application data 205, equipment sensors 210, or the sensor array 215 may be combined in the contextual engine 230. The contextual engine 230 may engage in filtering before the data reaches the intelligent agent 125. Such filtering may be applied to data type (e.g., work messaging versus personal messaging) or data quality (e.g., poor audio may be ignored). The contextual engine 230 may also package the data in a standard format expected by the intelligent agent 125, thus simplifying intelligent agent design. In an example, the contextual engine 230 may not be present and the data is passed directly to the intelligent agent 125.

The intelligent agent 125 may include history 130, rules 135, and thresholds 140. The interaction of these components may proceed as described above. As illustrated, the thresholds 140 may include a respective value on a line between high and low to represent the threshold. The thresholds 140 may be at an alert level, as illustrated. The factors set member influence described above may be implemented by adjusting the linear value corresponding to a threshold for an alert issued proximately (e.g., within a predetermined time period) to receipt of the detail-level-feedback input from the user input CS 225. In an example, the rules 135 include rules to perform the threshold adjustment. For example, a rule may specify the predetermined times and the translation of the specific detail-level-feedback input direction and degree into the specific threshold adjustment.

The operation of the components of the system 200 may, in an example, be summarized as receiving input, by the intelligent agent 125, from the contextual engine 230 and making adjustments to multiple thresholds 140 based on user input to a single control, and nor more, from the user input 225. Thus, the user 105 may provide simple feedback to the intelligent agent 125 which may then integrate the relevant context to adjust multiple factors of the intelligent agent 125.

Figure 3:
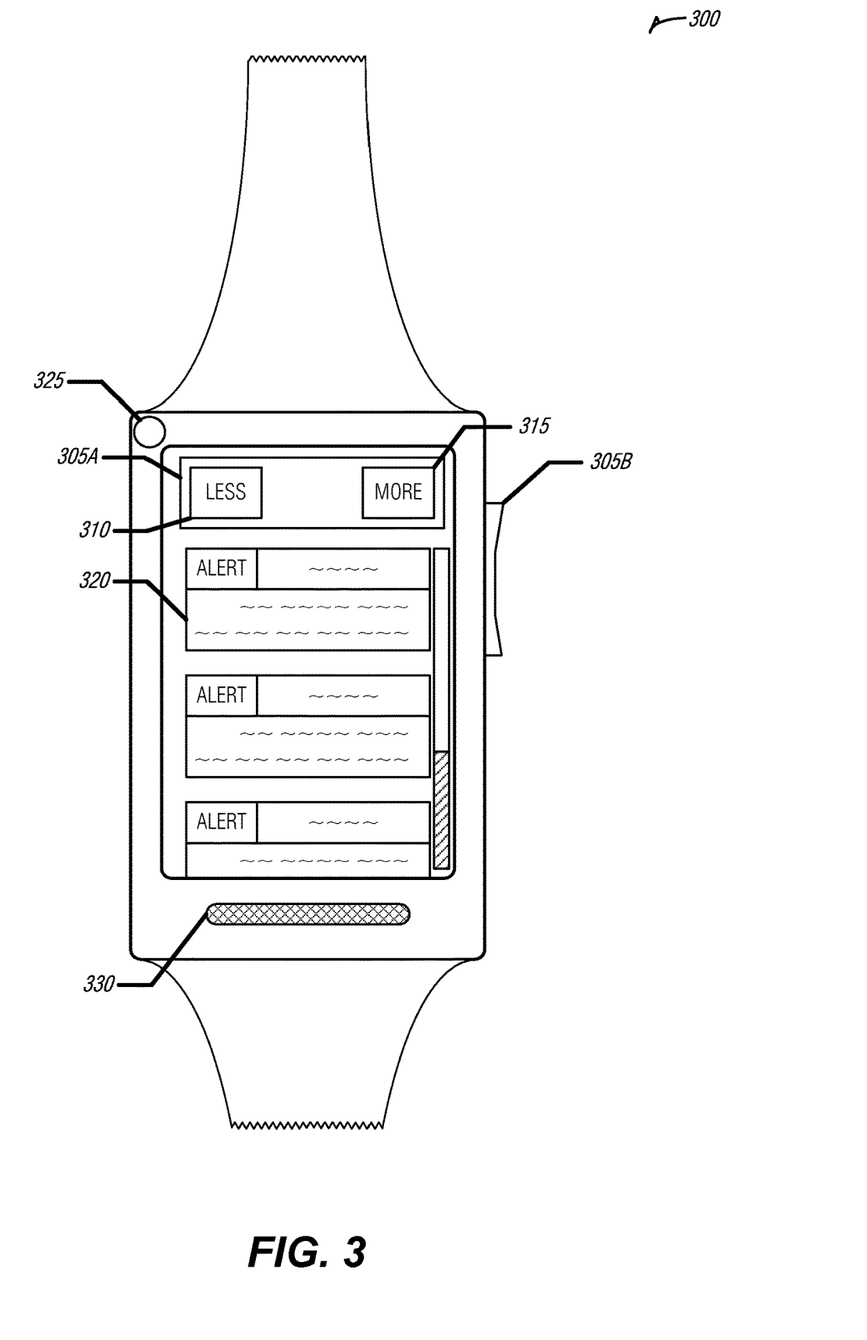
FIG. 3 illustrates an example of a wearable device and a user interface for multi-factor intelligent agent control, according to an embodiment.

FIG. 3 illustrates an example of a wearable device 300 and a user interface for multi-factor intelligent agent control. The wearable device 300 is illustrated as a smart watch, but other wearable configurations may be used, including the combination of a device (e.g., mobile phone, media player, etc.) and an adapter (e.g., case, strap, etc.) to allow the user 105 to wear the device.

The wearable device 300 may include a simple visual output 325 (e.g., a light), and audio output 330 (e.g., a speaker). The wearable device 300 may also include a screen to display alerts 320. The wearable device may provide the detail-level-feedback user interface 305. In an example, the detail-level-feedback user interface 305 may be a control on the screen, such as 305A. As illustrated user interface 305A includes a less control 310 and a more control 315. In an example, a slider, or other input may be used by the user interface 305A. Such an interface 305A may be implemented with a touch-screen, pointing device, or other graphical user input mechanism. In an example, the wearable device 300 may include a moving actuator user interface 305B. The user interface 305B may be a rocker (as illustrated), one or more buttons, a non-visual touch surface (e.g., touch pad), etc.

Figure 4:
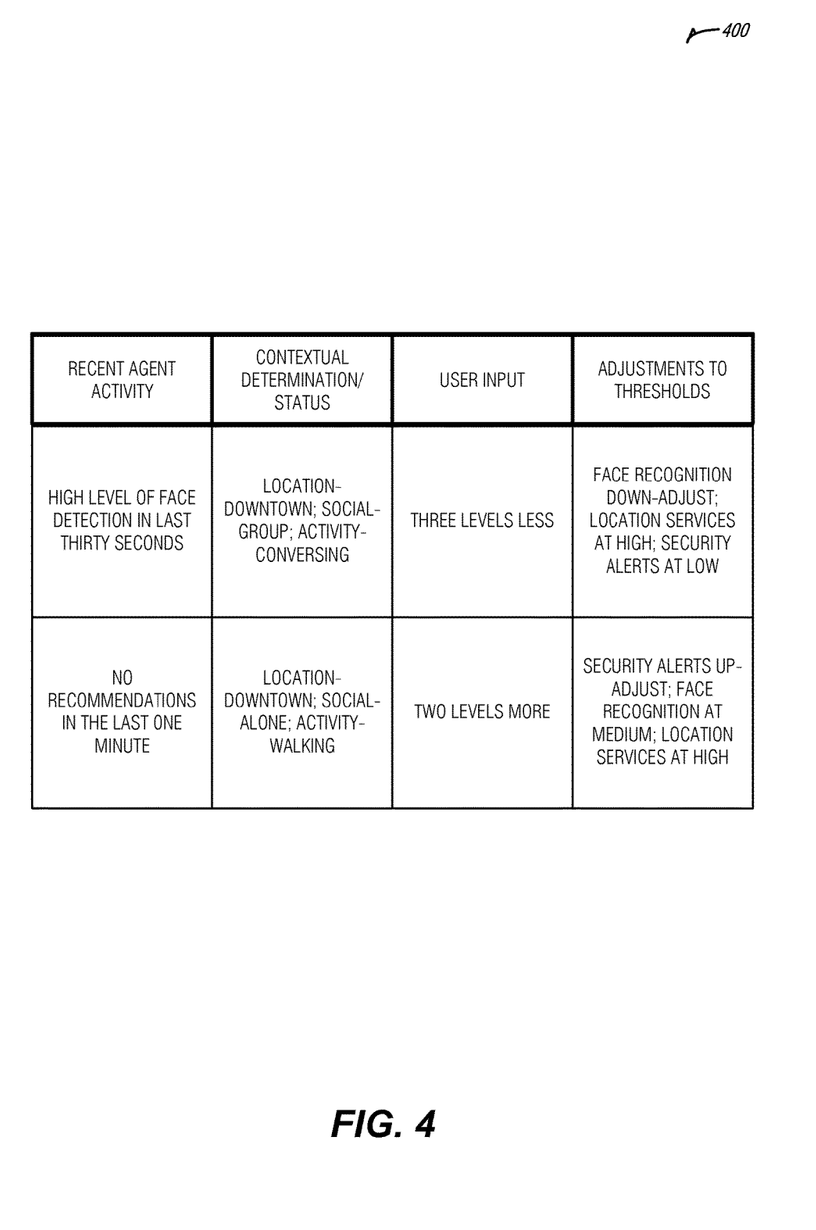
FIG. 4 illustrates an example matrix of a combination of context and single user input with resultant multi-factor control, according to an embodiment.

FIG. 4 illustrates an example matrix 400 of a combination of context and single user input with resultant multi-factor control. The matrix 400 may be an implementation of the rules described above with respect to FIGS. 1 and 2. Each row may represent a single rule to combine the detail-level-feedback input and the identified factors. For example, row one provides that the combination of a high level of face detection within the last half minute at a downtown social gathering that garnered detail-level-feedback input of a negative direction to a degree of three lowers thresholds for face recognition, and security alerts while increasing location services alerts.

Figure 5:
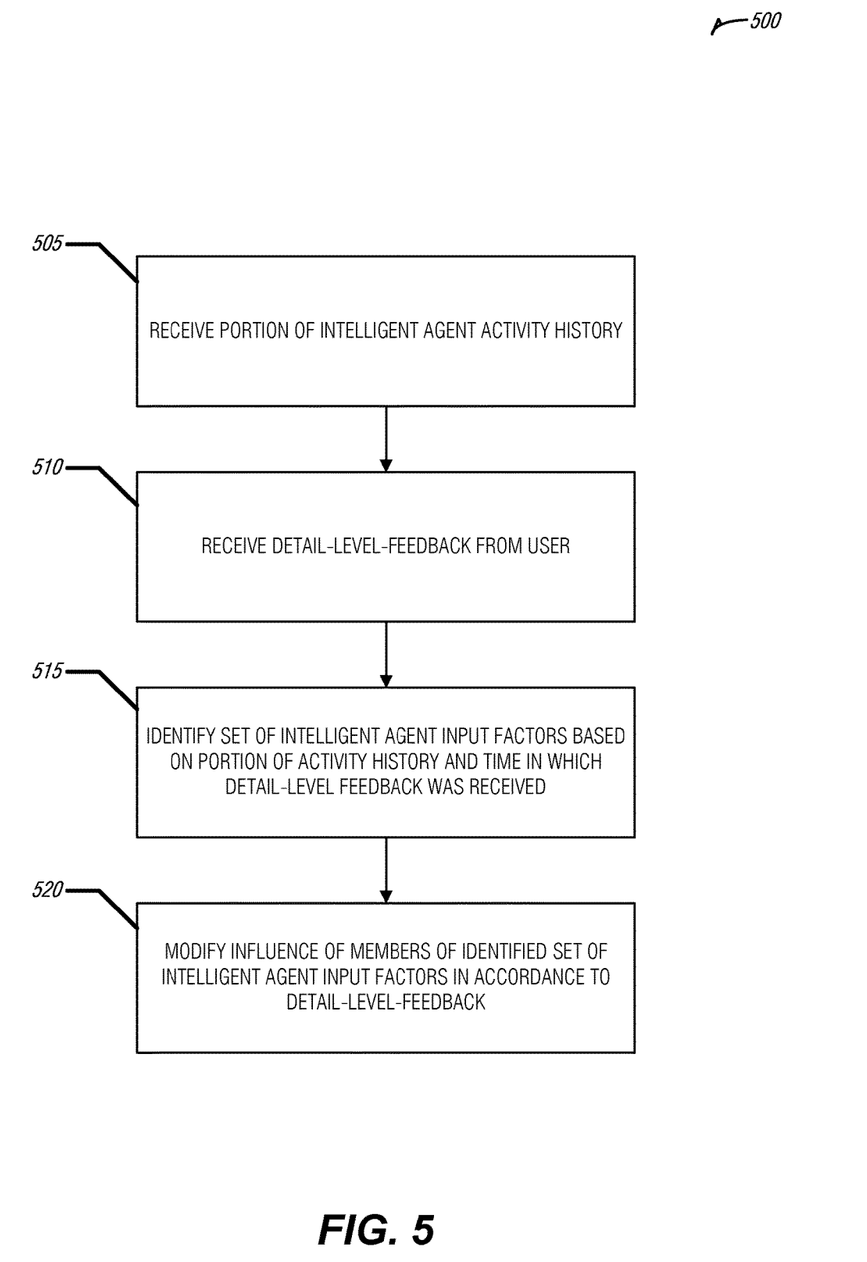
FIG. 5 illustrates a flow diagram of an example of a method for multi-factor intelligent agent control, according to an embodiment.

FIG. 5 illustrates a flow diagram of an example of a method 500 for multi-factor intelligent agent control. The operations of the method 500 are performed by a computer system designed to support, in part, an intelligent agent and sensors to produce factor data.

At operation 505 a portion of a history of intelligent agent activity may be received. The receipt may be in response to a request by the computer system or it may be delivered, for example, on a schedule or in response to intelligent agent activity being logged in the history.

At operation 510 detail-level-feedback input may be received from a user. The detail-level-feedback input is the result of the user manipulating a detail-level-feedback user interface that is not specific to a factor used as input to an intelligent agent that generated an intelligent agent activity in the history of intelligent agent activity. That is, the user interface does not correspond with any particular factor outside of the received history context. The detail-level-feedback user interface may be on a device used by a user;

At operation 515 the computer system may identify a set of factors based on the portion of the history of intelligent agent activity and a time in which the detail-level-feedback input was received. In an example, the set of factors may include a value obtained from a sensor. In an example, the sensor may be determined relevant to the user by the computer system based on a physical distance between the sensor and the user and the type of sensor. Accordingly, as described above, some sensor types, such as a proximity detector for devices to determine who is close to the user, are not relevant unless they are within an area (e.g., room) occupied by the user. In an example, the sensor may be worn by the user.

In an example, identifying the set of factors may include finding input factors used as inputs to the intelligent agent for intelligent agent activity in the history of intelligent agent activity that are within a predetermined time period of the detail-level-feedback input. In an example, the predetermined time period is different between at least two of the input factors. In an example, the at least two of the input factors are of different factor types and the predetermined time period is specific to a factor type. For example, factors related to face recognition (e.g., of people around the user) may have a shorter corresponding predetermined time period to less transient factors such as location recommendations for a holiday.

At operation 520 an influence of members of the set of factors on future intelligent agent activity may be modified by the computer system in accordance with the detail-level-feedback input. In an example, modifying the influence of members of the set of factors may include adjusting a weight of the members in accordance with the detail-level-feedback input. In an example, adjusting the weight of the members may include adjusting a first weight corresponding to a first member differently than a second weight corresponding to a second member. In an example where the detail-level-feedback input includes a direction, the first weight may adjusted in the direction and the second weight is not in adjusted the direction. In an example, the detail-level-feedback input may have two possible directions, a first direction and a second direction, and the direction is the first direction (to which the first weight is adjusted) the second weight is adjusted in the second possible direction.

In an example, modifying the influence of members of the set of factors may include adjusting an event threshold of intelligent agent activity in which the members are used by the intelligent agent. In an example, adjusting the event threshold may include modifying a zonal filter of the intelligent agent corresponding one of the members. In an example, the detail-level-feedback input may include a direction and the zonal filter of the intelligent agent corresponding one of the members includes may be modified by adjusting an envelope of the zonal filter in the direction. Here "in the direction" may include one or both of increasing the size of the envelope or shifting the envelope up or down.

Figure 6:
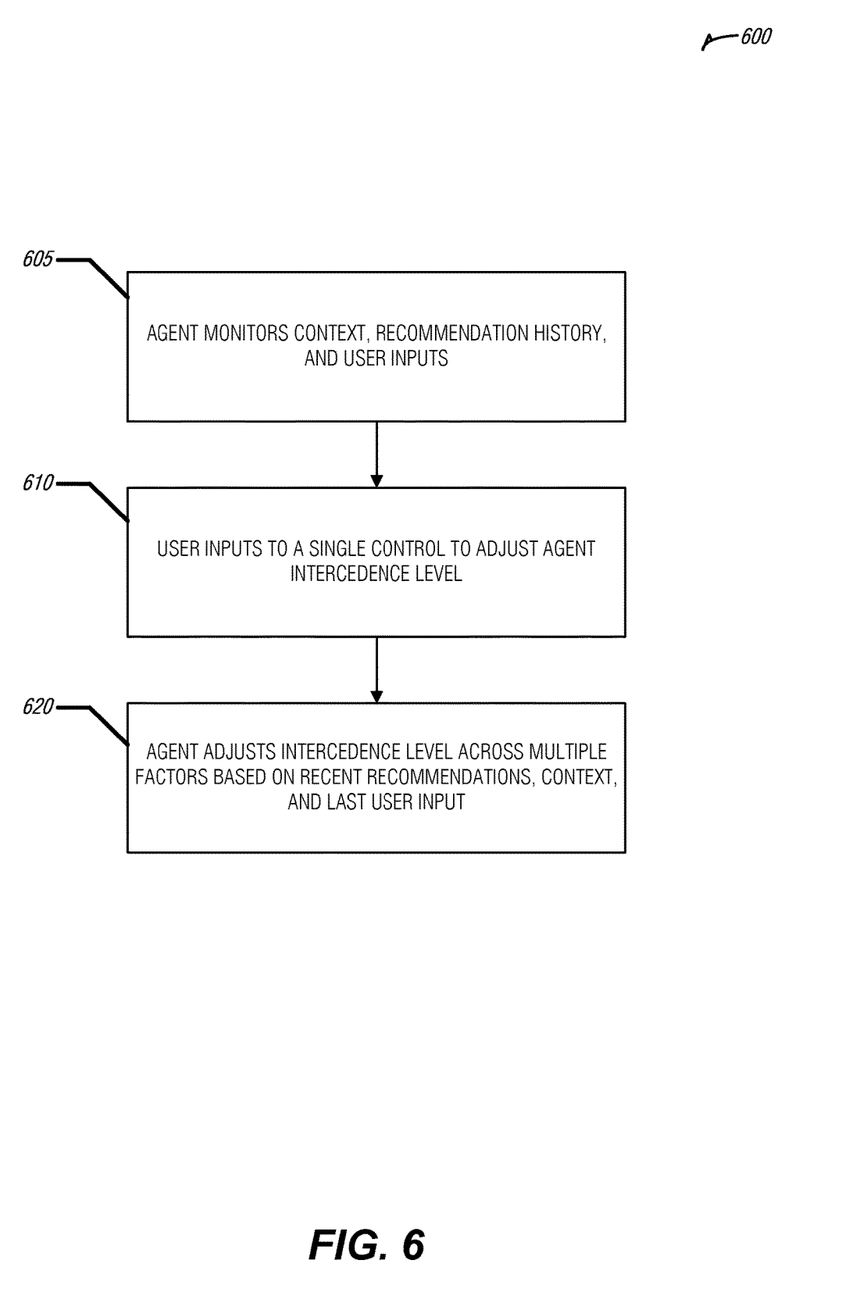
FIG. 6 illustrates a flow diagram of an example of a method for multi-factor intelligent agent control, according to an embodiment.

FIG. 6 illustrates a flow diagram of an example of a method 600 for multi-factor intelligent agent control, according to an embodiment.

At operation 605 an intelligent agent may monitor all of a current context (e.g., from a variety of sensors), a recommendation history (e.g., alerts or other recommendations made to the user by the intelligent agent), and user inputs (e.g., detail-level-feedback inputs) from a single user control.

At operation 610 the user inputs from the single control may be received by the intelligent agent to adjust one or more intercedence levels of the intelligent agent.

At operation 615 The intelligent agent may adjust one or more intercedence levels across multiple factors based on all of recent recommendations, context, and the last user input to the single control.

The operation of the method 600 permits a simple user interaction with the intelligent agent that results in complex control of complex multi-factor intelligent agents. For example, a wearable device may have a simple input to control the level of an agent. If the agent had recently been giving a lot of feedback on facial recognition, and the user adjusts the control to lower agent involvement, the system may lessen facial recognition alerts while not altering location-based service alerts, which may continue based on contextual sensing.

Figure 7:
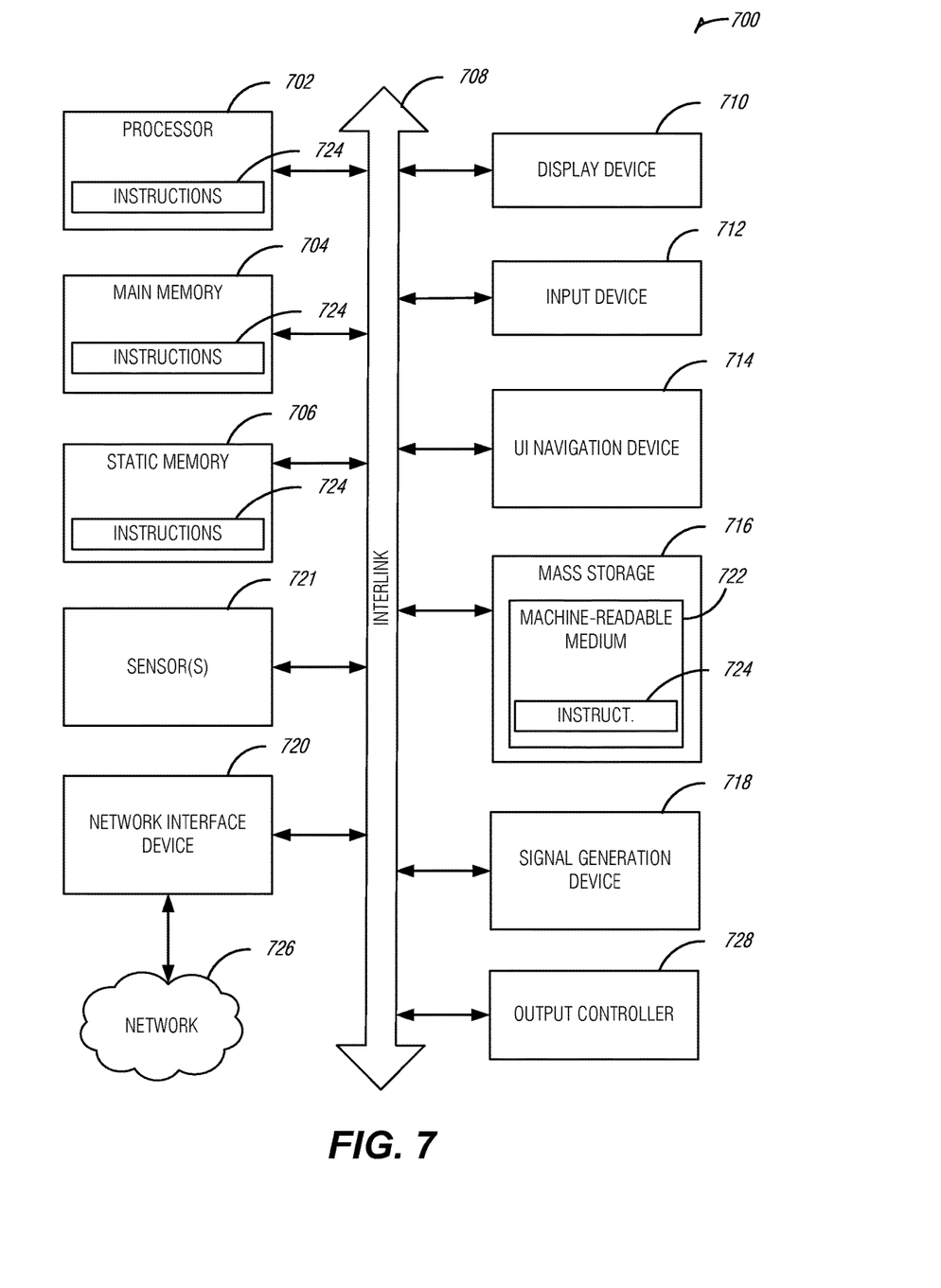
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

Additional Notes & Examples

Example 1 may include subject matter (such as a device, apparatus, or a system for multifactor intelligent agent control) comprising a history circuit set to obtain a history of intelligent agent activity for an intelligent agent—the history including a record of intelligent agent activities and corresponding factors used as intelligent agent input to generate the activities, a feedback circuit set to obtain detail-level-feedback input from a user—the detail-level-feedback input resulting from user manipulation of a detail-level-feedback user interface that is generic to any factor, and an entry-time corresponding to the user manipulation of the detail-level-feedback user interface, an identification circuit set to identify a set of factors from the corresponding factors based on a combination of the history of intelligent agent activity and the entry-time, and an adjustment circuit set to modify the intelligent agent by changing an internally represented influence of members of the set of factors on the intelligent agent—the internally represented influence being changed in accordance with the detail-level-feedback input.

In Example 2, the subject matter of Example 1 may optionally include, wherein the set of factors include a value obtained from data from a sensor.

In Example 3, the subject matter of Example 2 may optionally include, wherein the sensor is relevant to the user based on a physical distance between the sensor and the user and the type of sensor.

In Example 4, the subject matter of Example 3 may optionally include, wherein the sensor is worn by the user.

In Example 5, the subject matter of any of Examples 1-4 may optionally include, wherein to modify the influence of members of the set of factors includes the adjustment circuit set to adjust a weight of the members in accordance with the detail-level-feedback input.

In Example 6, the subject matter of Example 5 may optionally include, wherein to adjust the weight of the members includes the adjustment circuit set to adjust a first weight corresponding to a first member differently than a second weight corresponding to a second member.

In Example 7, the subject matter of Example 6 may optionally include, wherein the detail-level-feedback input includes a direction and wherein the first weight is adjusted in the direction and the second weight is not adjusted in the direction.

In Example 8, the subject matter of Example 7 may optionally include, wherein the detail-level-feedback input has two possible directions, a first direction and a second direction, wherein the direction is the first direction, and wherein the second weight is adjusted in the second direction.

In Example 9, the subject matter of any of Examples 1-8 may optionally include, wherein to modify the influence of members of the set of factors includes the adjustment circuit set is to adjust an alert threshold of intelligent agent activity in which the members are used by the intelligent agent.

In Example 10, the subject matter of Example 9 may optionally include, wherein to adjust the alert threshold includes the adjustment circuit set to modify a zonal filter of the intelligent agent corresponding one of the members.

In Example 11, the subject matter of Example 10 may optionally include, wherein the detail-level-feedback input includes a direction, and wherein to modify the zonal filter of the intelligent agent corresponding one of the members includes the adjustment circuit set to adjust an envelope of the zonal filter in the direction.

In Example 12, the subject matter of any of Examples 1-11 may optionally include, wherein to identify the set of factors includes the identification circuit set to find input factors used as inputs to the intelligent agent for intelligent agent activity in the history of intelligent agent activity that are within a predetermined time period of the detail-level-feedback input.

In Example 13, the subject matter of Example 12 may optionally include, wherein the predetermined time period is different between at least two of the input factors.

In Example 14, the subject matter of Example 13 may optionally include, wherein the at least two of the input factors are of different factor types and the predetermined time period is specific to a factor type.

In Example 15, the subject matter of any of Examples 1-14 may optionally include, wherein the detail-level-feedback user interface includes a moving actuator on the device.

In Example 16, the subject matter of Example 15 may optionally include, wherein the moving actuator is a volume control.

Example 17 may include, or may optionally be combined with the subject matter of any one of Examples 1-16 to include, subject matter (such as a method, means for performing acts, or machine readable medium including instructions that, when performed by a machine cause the machine to performs acts for multifactor intelligent agent control) comprising receiving a history of intelligent agent activity—the history including a record of intelligent agent activities and corresponding factors used as intelligent agent input to generate the activities, receiving detail-level-feedback input from a user—the detail-level-feedback input resulting from user manipulation of a detail-level-feedback user interface that is generic to any factor—and recording an entry-time corresponding to the user manipulation of the detail-level-feedback user interface, identifying—using a computer system—a set of factors from the corresponding factors based on a combination of the history of intelligent agent activity and the entry-time, and modifying—using the computer system—the intelligent agent by changing an internally represented influence of members of the set of factors on the intelligent agent—the internally represented influence being changed in accordance with the detail-level-feedback input.

In Example 18, the subject matter of Example 17 may optionally include, wherein the set of factors include a value obtained from a sensor.

In Example 19, the subject matter of Example 18 may optionally include, wherein the sensor is relevant to the user based on a physical distance between the sensor and the user and the type of sensor.

In Example 20, the subject matter of Example 19 may optionally include, wherein the sensor is worn by the user.

In Example 21, the subject matter of any of Examples 17-20 may optionally include, wherein modifying the influence of members of the set of factors includes adjusting a weight of the members in accordance with the detail-level-feedback input.

In Example 22, the subject matter of Example 21 may optionally include, wherein adjusting the weight of the members includes adjusting a first weight corresponding to a first member differently than a second weight corresponding to a second member.

In Example 23, the subject matter of Example 22 may optionally include, wherein the detail-level-feedback input includes a direction and wherein the first weight is adjusted in the direction and the second weight includes a component that is not in the direction.

In Example 24, the subject matter of Example 23 may optionally include, wherein the detail-level-feedback input has two possible directions, a first direction and a second direction, wherein the direction is the first direction, and wherein the second weight is adjusted in the second direction.

In Example 25, the subject matter of any of Examples 17-24 may optionally include, wherein modifying the influence of members of the set of factors includes adjusting an alert threshold of intelligent agent activity in which the members are used by the intelligent agent.

In Example 26, the subject matter of Example 25 may optionally include, wherein adjusting the alert threshold includes modifying a zonal filter of the intelligent agent corresponding one of the members.

In Example 27, the subject matter of Example 26 may optionally include, wherein the detail-level-feedback input includes a direction, and wherein modifying the zonal filter of the intelligent agent corresponding one of the members includes adjusting an envelope of the zonal filter in the direction.

In Example 28, the subject matter of any of Examples 17-27 may optionally include, wherein identifying the set of factors includes finding input factors used as inputs to the intelligent agent for intelligent agent activity in the history of intelligent agent activity that are within a predetermined time period of the detail-level-feedback input.

In Example 29, the subject matter of Example 28 may optionally include, wherein the predetermined time period is different between at least two of the input factors.

In Example 30, the subject matter of Example 29 may optionally include, wherein the at least two of the input factors are of different factor types and the predetermined time period is specific to a factor type.

In Example 31, the subject matter of any of Examples 17-30 may optionally include, wherein the detail-level-feedback user interface includes a moving actuator on the device.

In Example 32, the subject matter of Example 31 may optionally include, wherein the moving actuator is a volume control.

Example 33 includes subject matter comprising at least one machine-readable medium including instructions that, when executed by a machine, cause the machine to perform a method of any of Examples 17-32.

Example 34 includes subject matter comprising system including means to perform a method of any of Examples 17-32.

Example 35 may include, or may optionally be combined with the subject matter of any one of Examples 1-34 to include, subject matter (such as a device, apparatus, or a system for multifactor intelligent agent control) comprising receiving means to receive a history of intelligent agent activity for an intelligent agent—the history including a record of intelligent agent activities and corresponding factors used as intelligent agent input to generate the activities, user input means to receive detail-level-feedback input from a user—the detail-level-feedback input resulting from user manipulation of a detail-level-feedback user interface that is generic to any factor—and to receive an entry-time corresponding to the user manipulation of the detail-level-feedback user interface, identifying means to identify a set of factors from the corresponding factors based on a combination of the history of intelligent agent activity and the entry-time, and modifying means to modify the intelligent agent by changing an internally represented influence of members of the set of factors on the intelligent agent—the internally represented influence being changed in accordance with the detail-level-feedback input.

In Example 36, the subject matter of Example 35 may optionally include, wherein the set of factors include a value obtained from a sensor.

In Example 37, the subject matter of Example 36 may optionally include, wherein the sensor is relevant to the user based on a physical distance between the sensor and the user and the type of sensor.

In Example 38, the subject matter of Example 37 may optionally include, wherein the sensor is worn by the user.

In Example 39, the subject matter of any of Examples 35-38 may optionally include, wherein to modify the influence of members of the set of factors includes the modifying means to adjust a weight of the members in accordance with the detail-level-feedback input.

In Example 40, the subject matter of Example 39 may optionally include, wherein to adjust the weight of the members includes the modifying means to adjust a first weight corresponding to a first member differently than a second weight corresponding to a second member.

In Example 41, the subject matter of Example 40 may optionally include, wherein the detail-level-feedback input includes a direction and wherein the first weight is adjusted in the direction and the second weight includes a component that is not in the direction.

In Example 42, the subject matter of Example 41 may optionally include, wherein the detail-level-feedback input has two possible directions, a first direction and a second direction, wherein the direction is the first direction, and wherein the second weight is adjusted in the second direction.

In Example 43, the subject matter of any of Examples 35-42 may optionally include, wherein to modify the influence of members of the set of factors includes the modifying means to adjust an alert threshold of intelligent agent activity in which the members are used by the intelligent agent.

In Example 44, the subject matter of Example 43 may optionally include, wherein to adjust the alert threshold includes the modifying means to modify a zonal filter of the intelligent agent corresponding one of the members.

In Example 45, the subject matter of Example 44 may optionally include, wherein the detail-level-feedback input includes a direction, and wherein to modify the zonal filter of the intelligent agent corresponding one of the members includes the modifying means to adjust an envelope of the zonal filter in the direction.

In Example 46, the subject matter of any of Examples 35-45 may optionally include, wherein to identify the set of factors includes the identifying means to find input factors used as inputs to the intelligent agent for intelligent agent activity in the history of intelligent agent activity that are within a predetermined time period of the detail-level-feedback input.

In Example 47, the subject matter of Example 46 may optionally include, wherein the predetermined time period is different between at least two of the input factors.

In Example 48, the subject matter of Example 47 may optionally include, wherein the at least two of the input factors are of different factor types and the predetermined time period is specific to a factor type.

In Example 49, the subject matter of any of Examples 35-48 may optionally include, wherein the detail-level-feedback user interface includes a moving actuator on the device.

In Example 50, the subject matter of Example 49 may optionally include, wherein the moving actuator is a volume control.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for multifactor intelligent agent control, the system comprising:
   a history circuit set to obtain a history of intelligent agent activity for an intelligent agent, the history including a record of intelligent agent activities and corresponding factors used as intelligent agent input to generate the activities, an intelligent agent activity being an alert with user output that takes the form of a visual output, an audio output, or a haptic output;
   a feedback circuit set to obtain:
      detail-level-feedback input from a user, the detail-level-feedback input resulting from user manipulation of a single detail-level-feedback user interface for all factors and generic to any given factor, wherein being generic to any given factor means that the user interface does not include identified controls for individual factors nor are controls reassigned to factors prior to use by the user, wherein the detail-level-feedback user interface is arranged to accept input in one of two directions, the two directions being greater or less; and
      an entry-time corresponding to the user manipulation of the detail-level-feedback user interface;
   an identification circuit set to identify a set of factors from the corresponding factors based on a combination of the history of intelligent agent activity and the entry-time that corresponds to the user manipulation of the detail-level feedback, the set of factors being those used by the intelligent agent to generate the activities including the alert; and
   an adjustment circuit set to modify the intelligent agent by changing an internally represented influence of members of the set of factors on the intelligent agent, the internally represented influence being changed in accordance with the detail-level-feedback input by numerically changing the internally represented influence positively or negatively depending upon whether the detail-level-feedback input from the user is greater or less respectively to change a level of detail to present to the user for the intelligent agent activity by the intelligent agent and by other intelligent agents that also uses the set of factors, the level of detail including a frequency of alerts or amount of information conveyed in an alert.

2. The system of claim 1, wherein to modify the influence of members of the set of factors includes the adjustment circuit set to adjust a weight of the members in accordance with the detail-level-feedback input.

3. The system of claim 2, wherein to adjust the weight of the members includes the adjustment circuit set to adjust a first weight corresponding to a first member differently than a second weight corresponding to a second member.

4. The system of claim 3, wherein the detail-level-feedback input includes a direction and wherein the first weight is adjusted in the direction and the second weight is not adjusted in the direction.

5. The system of claim 1, wherein to modify the influence of members of the set of factors includes the adjustment circuit set is to adjust an alert threshold of intelligent agent activity in which the members are used by the intelligent agent.

6. The system of claim 1, wherein to identify the set of factors includes the identification circuit set to find input factors used as inputs to the intelligent agent for intelligent agent activity in the history of intelligent agent activity that are within a predetermined time period of the detail-level-feedback input.

7. The system of claim 6, wherein the predetermined time period is different between at least two of the input factors.

8. The system of claim 7, wherein the at least two of the input factors are of different factor types and the predetermined time period is specific to a factor type.

9. A method for multifactor intelligent agent control, the method comprising:
   receiving a history of intelligent agent activity, the history including a record of intelligent agent activities and corresponding factors used as intelligent agent input to generate the activities, an intelligent agent activity being an alert with user output that takes the form of a visual output, an audio output, or a haptic output;
   receiving detail-level-feedback input from a user, the detail-level-feedback input resulting from user manipulation of a single detail-level-feedback user interface for all factors that is generic to any factor, wherein being generic to any given factor means that the user interface does not include identified controls for individual factors nor are controls reassigned to factors prior to use by the user, wherein the detail-level-feedback user interface is arranged to accept input in one of two directions, the two directions being greater or less;
   recording an entry-time corresponding to the user manipulation of the detail-level-feedback user interface;
   identifying, using a computer system, a set of factors from the corresponding factors based on a combination of the history of intelligent agent activity and the entry-time that corresponds to the user manipulation of the detail-level feedback, the set of factors being those used by the intelligent agent to generate the activities including the alert; and
   modifying, using the computer system, the intelligent agent by changing an internally represented influence of members of the set of factors on the intelligent agent, the internally represented influence being changed in accordance with the detail-level-feedback input by numerically changing the internally represented influence positively or negatively depending upon whether the detail-level-feedback input from the user is greater or less respectively to change a level of detail to present to the user for the intelligent agent activity by the intelligent agent and by other intelligent agents that also uses the set of factors, the level of detail including a frequency of alerts or amount of information conveyed in an alert.

10. The method of claim 9, wherein modifying the influence of members of the set of factors includes adjusting a weight of the members in accordance with the detail-level-feedback input.

11. The method of claim 10, wherein adjusting the weight of the members includes adjusting a first weight corresponding to a first member differently than a second weight corresponding to a second member.

12. The method of claim 11, wherein the detail-level-feedback input includes a direction and wherein the first weight is adjusted in the direction and the second weight includes a component that is not in the direction.

13. The method of claim 9, wherein modifying the influence of members of the set of factors includes adjusting an alert threshold of intelligent agent activity in which the members are used by the intelligent agent.

14. The method of claim 9, wherein identifying the set of factors includes finding input factors used as inputs to the intelligent agent for intelligent agent activity in the history of intelligent agent activity that are within a predetermined time period of the detail-level-feedback input.

15. The method of claim 14, wherein the predetermined time period is different between at least two of the input factors.

16. The method of claim 15, wherein the at least two of the input factors are of different factor types and the predetermined time period is specific to a factor type.

17. At least one machine readable medium that is not a transitory propagating signal, the machine readable medium including instruction that, when executed by a machine, cause the machine to perform operations for multifactor intelligent agent control, the operations:

receiving a history of intelligent agent activity, the history including a record of intelligent agent activities and corresponding factors used as intelligent agent input to generate the activities, an intelligent agent activity being an alert with user output that takes the form of a visual output, an audio output, or a haptic output;

receiving detail-level-feedback input from a user, the detail-level-feedback input resulting from user manipulation of a single detail-level-feedback user interface for all factors that is generic to any factor, wherein being generic to any given factor means that the user interface does not include identified controls for individual factors nor are controls reassigned to factors prior to use by the user, wherein the detail-level-feedback user interface is arranged to accept input in one of two directions, the two directions being greater or less;

recording an entry-time corresponding to the user manipulation of the detail-level-feedback user interface;

identifying, using a computer system, a set of factors from the corresponding factors based on a combination of the history of intelligent agent activity and the entry-time that corresponds to the user manipulation of the detail-level feedback, the set of factors being those used by the first intelligent agent to generate the activities including the alert; and modifying, using the computer system, the intelligent agent by changing an internally represented influence of members of the set of factors on the intelligent agent, the internally represented influence being changed in accordance with the detail-level-feedback input by numerically changing the internally represented influence positively or negatively depending upon whether the detail-level-feedback input from the user is greater or less respectively to change a level of detail to present to the user for the intelligent agent activity by the first intelligent agent and by other intelligent agents that also uses the set of factors, the level of detail including a frequency of alerts or amount of information conveyed in an alert.

18. The at least one machine readable medium of claim 17, wherein modifying the influence of members of the set of factors includes adjusting a weight of the members in accordance with the detail-level-feedback input.

19. The at least one machine readable medium of claim 18, wherein adjusting the weight of the members includes adjusting a first weight corresponding to a first member differently than a second weight corresponding to a second member.

20. The at least one machine readable medium of claim 19, wherein the detail-level-feedback input includes a direction and wherein the first weight is adjusted in the direction and the second weight includes a component that is not in the direction.

21. The at least one machine readable medium of claim 17, wherein modifying the influence of members of the set of factors includes adjusting an alert threshold of intelligent agent activity in which the members are used by the intelligent agent.

22. The at least one machine readable medium of claim 17, wherein identifying the set of factors includes finding input factors used as inputs to the intelligent agent for intelligent agent activity in the history of intelligent agent activity that are within a predetermined time period of the detail-level-feedback input.

23. The at least one machine readable medium of claim 22, wherein the predetermined time period is different between at least two of the input factors.

24. The at least one machine readable medium of claim 23, wherein the at least two of the input factors are of different factor types and the predetermined time period is specific to a factor type.

* * * * *